Aug. 10, 1948.  A. A. LOSCH  2,446,938
OVERHEAD LOADER

Filed Dec. 18, 1946  2 Sheets-Sheet 1

INVENTOR
A.A.Losch

ATTYS

Aug. 10, 1948.          A. A. LOSCH          2,446,938
                      OVERHEAD LOADER
Filed Dec. 18, 1946                    2 Sheets-Sheet 2
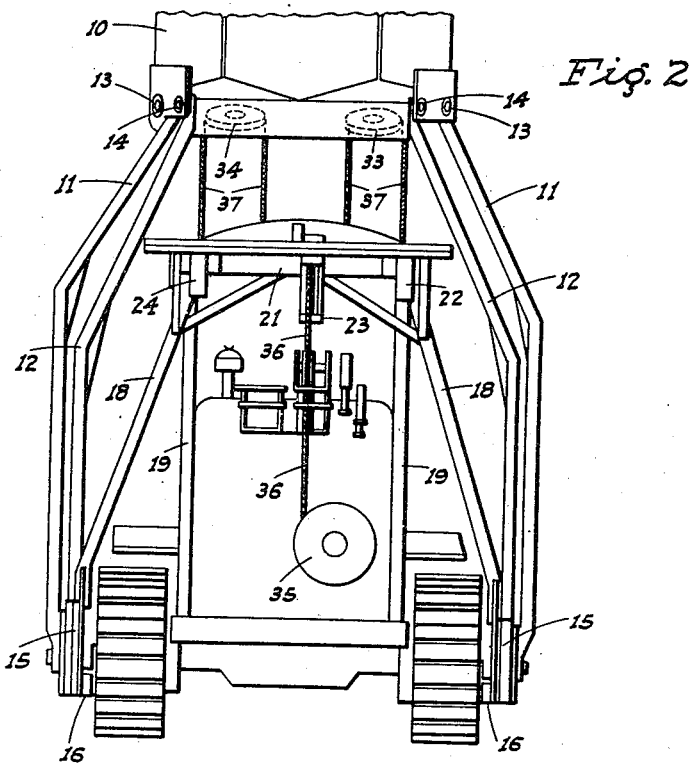
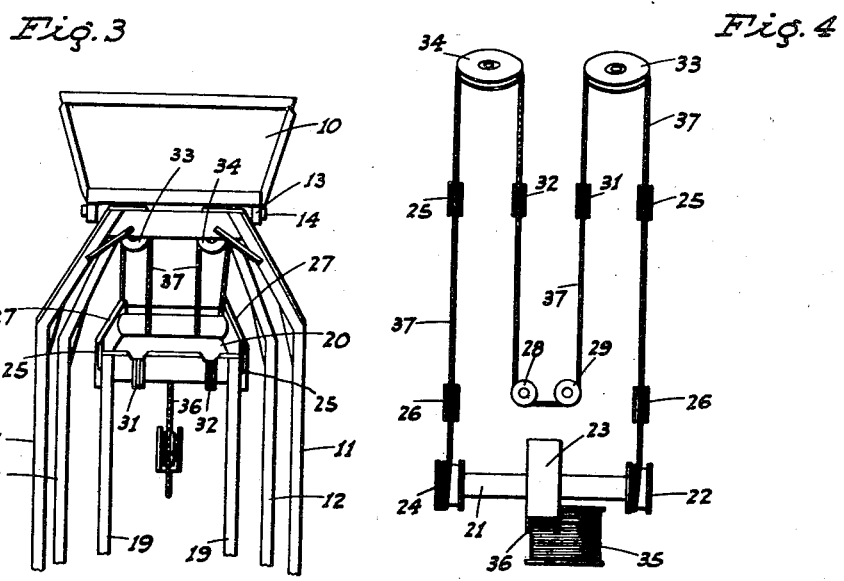
INVENTOR
A.A.Losch
ATTYS Patented Aug. 10, 1948

2,446,938

UNITED STATES PATENT OFFICE 2,446,938

OVERHEAD LOADER

Albert Arthur Losch, Rydalmere, New South Wales, Australia, assignor to R. G. Le Tourneau, Inc., Stockton, Calif., a corporation of California Application December 18, 1946, Serial No. 717,014 In Australia December 21, 1945

1 Claim. (Cl. 214—131)

This invention relates to loading equipment mounted upon a mobile vehicle such as a tractor and wherein the soil or similar material to be loaded is received in a scoop and is elevated above the vehicle and is transported to the rear where it is automatically dumped.

An object of the present invention is to give a double purchase line pull by the use of double purchase sheaves, and at the same time a controlled automatic tipping of the scoop by the use of an articulating member or arm.

Another object of the present invention is to provide an overhead loader wherein the lifting of the loaded scoop in the preliminary state is easily effected and wherein the travel of the scoop is relatively fast during the whole operation of lifting, transporting and discharging.

It has been disclosed that the known types of overhead loaders of the kind referred to, use a single line pull and that the scoop or bucket tilts rearwardly before reaching the discharge position due to it being in a fixed position in relation to its raising arms or pushbeams throughout its cycle of operation.

The present invention reduces spillage to a minimum, as the scoop tilts rearwardly only when approaching the discharge position and then the tilting is effected rapidly by articulating arms.

The cable system of the present device is also such that double the normal purchase is obtained at the commencement of the lift, as compared with the elevating and transversing periods, the initial lift and elevation being followed by more rapid tilting operations.

In order that the invention may be more readily understood, reference will now be made to the accompanying drawings wherein:

Figure 2 is a rear detail view showing the method of cable reeving and double purchase cable movement.

Figure 3 is a front view corresponding to Figure 2.

Figure 4 is a diagrammatic view of the cable reeving system.

Figure 1:
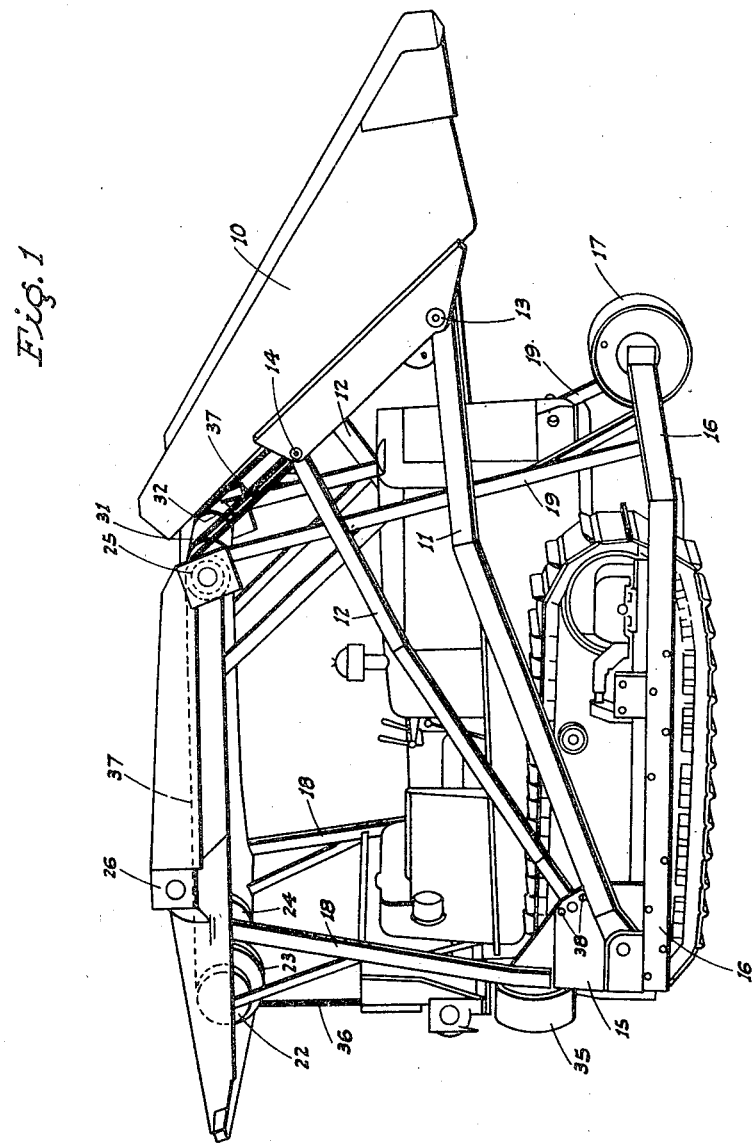
Figure 1 is a side view of one form of the present invention showing the main frame and articulating construction.

The scoop 10 is attached on either side to pushbeams 11, and articulating arms 12 by pin joints 13 and 14, the said pushbeams 11 and articulating arms 12 being pinned to pivot housings 15 one on each side of the device, such pivot housings 15 being an integral part of the main chassis frame 16. A ground roller 17 is mounted on the chassis frame 16 to give balance to the machine and prevent "nosing down" when loading.

The main chassis frame 16 also has attached thereto a rear frame 18 and a front frame 19 which support a main overhead structure 20, see Figure 3, in which a hauling shaft 21 is mounted at the rear thereof. The said shaft 21 has two hauling drums 22 and 24 and a central drum 23 secured thereto. The said overhead structure 20, Figure 3, has a frame 27 upon which a front pair of sheaves 25 and a rear pair of sheaves 26 are pinned. Two small guide sheaves 28 and 29, see Figure 4, termed double purchase sheaves, are pinned in a fixed housing, not shown, within the main overhead structure 20, Figure 3, in an intermediate position.

Two small cable guide sheaves 31 and 32 are mounted on the front edge of the main overhead structure 20, see Figures 1 and 3 and two swivel sheaves 33 and 34, see Figures 2, 3 and 4, termed for convenience lift sheaves, are located on the front of the pushbeams 11, by which means the latter and the scoop 10 are raised or lowered.

The above construction is mounted on a mobile vehicle such as a tractor, Figures 1 and 2, by driving the vehicle into the structure from the rear and then fastening the main chassis frame 16 to the chassis of the tractor, by means of bolts in known manner.

The tractor is provided with a rear winch drum unit 35 of known construction, from which a cable 36, termed for convenience the winch cable, passes to the said large centre drum 23 around which several turns are wound, the ends of the said winch cable 36 being anchored respectively to the said rear winch drum unit 35 and the said large centre drum 23.

Another cable 37 termed for convenience the hauling cable, and used to control the raising and lowering of the scoop 10 has both ends thereof placed through the said double purchase guide sheaves 28 and 29 from the inner side of the said housing 20, the said cable ends being thence passed over the said cable guide sheaves 31 and 32, through the inner side of the said lift sheaves 33 and 34, up over the front sheaves 25—25 of the frame 27 and then under the rear sheaves 26—26 of the said frame 27 to the respective hauling drums 22 and 24 to which they are respectively attached.

There are adjusting positions 38 on the pivot housings 15 for the articulating arms 12 so that the cutting angle of the scoop 10 can be altered when digging or levelling.

The articulating arms 12 are placed so that when the pushbeams 11 and thus the scoop 10 are raised, the articulating arms 12 are given a radial movement, the movement and pivoting of the said articulating arms 12 being such that on passing the dead centre the said arms 12 describe a shorter arc than the pushbeams 11 and thereby impart a quick tilting action, rearwardly, to the scoop 10 to discharge the contents with minimum spillage.

The scoop 10 when relieved of its load returns by gravity as the rear winch drum 35 is reversed or freed by its clutch.

It may be mentioned that to fill the scoop 10 the articulating arms 12 and pushbeams 11 move forward with the tractor, which is driven into the material to be loaded, the scoop 10 being in the lowered position. The forward motion of the tractor fills the scoop 10 which is then raised, with its load, by operating the rear winch drum unit 35 in known manner whereby the winch cable 36 turns the large centre drum 23 thus reeving the hauling cable 37 into the hauling drums 22 and 24.

What is claimed is:

An overhead loading unit for attachment to a tractor, such unit comprising a chassis frame, means for attaching the chassis frame to a tractor, a scoop, push beams and articulated arms interposed between and pivotally connected with the chassis frame and scoop respectively, an upstanding front frame and an upstanding rear frame on the chassis frame, an overhead structure supported by said upstanding frames, a hauling shaft journaled in said overhead structure adjacent the rear end thereof, a central drum on said hauling shaft, a cable reeved on the drum and adapted for connection with an operating winch on the tractor, a pair of spaced hauling shaft, a pair of sheaves journaled on the overhead structure adjacent the forward end thereof, a pair of sheaves journaled on the overhead structure adjacent the rear end thereof, a pair of spaced guide sheaves supported in the overhead structure at a point intermediate the said front and rear sheaves, another pair of guide sheaves supported adjacent the forward end of the overhead structure in substantial alinement with said first named guide sheaves, a lift sheave swivel-mounted at the forward end of each of the push beams, and a cable secured about one of the hauling drums and then reeved through all the sheaves and being secured at its other end about the other hauling drum, all whereby upon rotation of the hauling shaft the scoop will be lifted and swung rearwardly into discharging position.

ALBERT ARTHUR LOSCH.

REFERENCES CITED

The following references are of record in the file of this patent:

UNITED STATES PATENTS

| Number | Name | Date |
| --- | --- | --- |
| 1,340,247 | Petersen | May 18, 1920 |
| 1,611,860 | Richey | Dec. 21, 1926 |
| 2,239,288 | Garner | Apr. 22, 1941 |
| 2,316,760 | Andersen et al. | Apr. 20, 1943 |
| 2,323,404 | Kuchar | July 6, 1943 |
| 2,377,495 | Hofmeister | June 5, 1945 |
| 2,407,425 | Horning et al. | Sept. 10, 1946 |